US008282464B2

(12) United States Patent
Chongolnee

(10) Patent No.: US 8,282,464 B2
(45) Date of Patent: Oct. 9, 2012

(54) METHOD FOR MULTI-LEVEL PROGRESSIVE JACKPOTS ON A BONUS WHEEL WAGERING GAME

(76) Inventor: Roongrunchai Chongolnee, Reno, NV (US)

(*) Notice: Subject to any disclaimer, the term of this patent is extended or adjusted under 35 U.S.C. 154(b) by 176 days.

(21) Appl. No.: 12/761,976

(22) Filed: Apr. 16, 2010

(65) Prior Publication Data

US 2011/0081963 A1 Apr. 7, 2011

Related U.S. Application Data

(60) Provisional application No. 61/248,488, filed on Oct. 4, 2009.

(51) Int. Cl.
*A63F 13/00* (2006.01)

(52) U.S. Cl. ........................................... 463/20; 463/16

(58) Field of Classification Search .............. 463/25–42, 463/16–20; 273/292, 143 R
See application file for complete search history.

(56) References Cited

U.S. PATENT DOCUMENTS

| | | | | |
|---|---|---|---|---|
| 5,292,127 A | | 3/1994 | Kelly | |
| 5,743,523 A | | 4/1998 | Kelly | |
| 7,591,723 B2 | | 9/2009 | Cregan et al. | |
| 7,614,952 B2 | | 11/2009 | Elias | |
| 7,967,676 B2 | * | 6/2011 | Rodgers et al. | 463/20 |
| 2001/0024971 A1 | | 9/2001 | Brossard | |
| 2004/0171417 A1 | * | 9/2004 | Beaulieu et al. | 463/20 |
| 2005/0054412 A1 | * | 3/2005 | Gauselmann | 463/16 |
| 2005/0054435 A1 | | 3/2005 | Rogers et al. | |
| 2006/0025201 A1 | | 2/2006 | Van Asdale | |
| 2006/0073873 A1 | * | 4/2006 | Rodgers et al. | 463/20 |
| 2006/0116190 A1 | | 6/2006 | Baerlocher | |
| 2007/0060273 A1 | | 3/2007 | Webb et al. | |
| 2007/0087808 A1 | * | 4/2007 | Luciano et al. | 463/16 |
| 2009/0005155 A1 | * | 1/2009 | Rodgers et al. | 463/20 |
| 2009/0247267 A1 | * | 10/2009 | Acres | 463/20 |

* cited by examiner

*Primary Examiner* — Masud Ahmed

(57) ABSTRACT

The device is a progressive jackpot system for a plurality of gaming machines. The progressive jackpot system includes at least one progressive jackpot with each progressive jackpot having an associated jackpot indicator based on color or symbols. The system includes a plurality of rotatable display wheels with a plurality of segments. Each wheel segment is adapted to display a numeric indicator and a first jackpot indicator. At least one win designator displaying a second jackpot indicator is positioned peripherally to each display wheel and each designator is adapted to indicate one of the segments as a selected segment. If the first jackpot indicator on the selected segment matches the second jackpot indicator of the win designator, then the system awards the progressive jackpot associated with the matching jackpot indicators as displayed on a progressive display. The first and second jackpot indicators may be changed intermittently by the associated gaming machines.

20 Claims, 3 Drawing Sheets

METHOD FOR MULTI-LEVEL PROGRESSIVE JACKPOTS ON A BONUS WHEEL WAGERING GAME

CROSS-REFERENCE TO RELATED APPLICATIONS

This application claims the benefit of U.S. Provisional Patent Application 61/248,488, filed on Oct. 4, 2009, and incorporated herein by reference.

STATEMENT REGARDING FEDERALLY SPONSORED RESEARCH AND DEVELOPMENT

Not Applicable.

FIELD OF THE INVENTION

This invention relates to gaming devices, and more particularly to an improved method and apparatus for a wheel-of-fortune-type gaming device.

DISCUSSION OF RELATED ART

Progressive jackpot games are well known in the art. For example, U.S. Pat. No. 5,743,523 to Kelly et al. on Apr. 28, 1998 teaches such a device. Such devices are made to provide additional excitement and motivation to play a game, especially a casino type game.

However, despite the development of many approaches to progressive jackpot games, these approaches often have significant limits.

U.S. Pat. No. 5,743,523 to Kelly et al. on Apr. 28, 1998 teaches a multi-game system with progressive bonus. The '523 device teaches using a traditional wheel-of-fortune-type gaming device to award a bonus. This type of device is fine for its intended purpose. However, a standard wheel-of-fortune-type gaming device is well known and commonplace and does not provide a heightened sense of excitement or motivation to play a game. Therefore, a device is needed that provides additional features beyond a traditional wheel-of-fortune-type gaming device.

U.S. Pat. No. 7,614,952 to Elias on Nov. 10, 2009 teaches a gaming device having multiple interacting rotators and translating indicator. However, even with this approach the novelty of the idea will eventually be common and boring. Without variation, players will eventually become bored with the same wheel-of-fortune layout. Therefore, a wheel-of-fortune device is need that adds more variation.

U.S. Pat. No. 7,591,723 to Cregan et al. on Sep. 22, 2009 teaches a gaming device having a mechanical indicator with a multiple win section. The Cregan device provides the excitement of multiple wins on one play. Also, the Cregan device teaches a wheel with changing LED lights for additional variation. Despite, the benefits taught by Cregan, there is still a need for additional elements of excitement and unpredictability to bring further enthusiasm to the playing action. Therefore, a wheel-of-fortune-type progressive jackpot gaming device is needed that requires that a win designator match the color or symbol on the wheel segment, making multiple wins more uncertain and exciting. Additionally, a wheel-of-fortune-type progressive jackpot gaming device is needed where the jackpot indicators on both the wheel and on the win designators intermittently change as the progressive jackpot totals increase adding an element of unpredictability. Furthermore, such a needed device would include multiple win designators to provide a distinct visual that multiple progressive jackpots can be won at the same time.

Therefore, there is a need for a device that provides additional features beyond a traditional wheel-of-fortune-type gaming device and adds more variation. Such a needed device would require that the win designator and the wheel segment match, making multiple wins more uncertain and exciting. Additionally, a wheel-of-fortune-type progressive jackpot gaming device is needed where the jackpot indicators on both the wheel and on the win designators intermittently change adding an element of unpredictability. Furthermore, such a needed device would include multiple win designators to provide a distinct visual that multiple progressive jackpots can be won at the same time. The present invention accomplishes these objectives.

SUMMARY OF THE INVENTION

The present device is a progressive jackpot system for a plurality of gaming machines. The progressive jackpot system includes at least one progressive jackpot. Each progressive jackpot has a different associated jackpot indicator. Each jackpot indicator is based on color or symbols. The colors or symbols of each jackpot indicator may be displayed by an electronic illumination means.

The progressive jackpot system includes a plurality of rotatable display wheels each associated with and actuated by one of the gaming machines in accordance to a predetermined set of spin rules. Each display wheel includes a front face portioned into a plurality of segments. Each segment is adapted to display a numeric indicator and a first jackpot indicator. At least one win designator is positioned peripherally to each display wheel and adapted to indicate one of the plurality of segments as a selected segment and displays a second jackpot indicator. A progressive display displays each progressive jackpot and each associated jackpot indicator.

When each display wheel is rotated and allowed to slow down and stop, the selected segment as indicated by the win designator indicates a selected won numerical amount based on the numeric indicator. If the first jackpot indicator on the selected segment matches the second jackpot indicator of the win designator, then the system awards the progressive jackpot associated with the matching jackpot indicators as displayed on the progressive display.

In one embodiment, each wheel includes a plurality of the win designators positioned peripherally thereto, with each win designator adapted to indicate one of the plurality of segments as a selected segment. The rotation of each display wheel as well as the display of each first jackpot indicator and each second jackpot indicator may be actuated by the associated gaming machine, in accordance with the predetermined set of rules. Also, each progressive jackpot and associated jackpot indicator on the progressive display are determined at least partially by data of each gaming machine.

The present invention is a device that provides additional features beyond a traditional wheel-of-fortune-type gaming device and adds more variation. The device requires that the win designator and the wheel segment matching jackpot indicators, making multiple wins more uncertain and exciting. Additionally, the progressive jackpot gaming device intermittently changes the jackpot indicators on both the wheel and on the win designators adding an element of unpredictability. Furthermore, the needed device includes multiple win designators to provide distinct visuals indicating that multiple progressive jackpots can be won at the same time. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
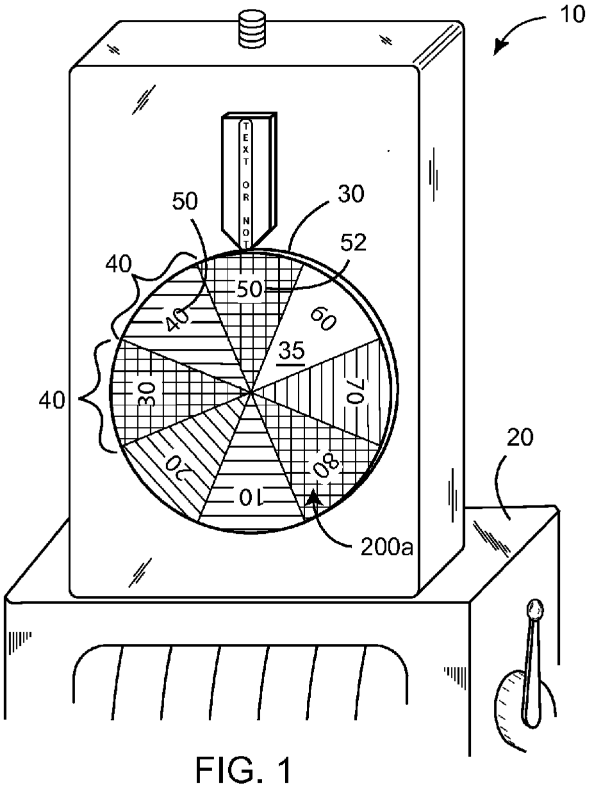
FIG. 1 is a perspective view of the progressive jackpot system.
Figure 5:
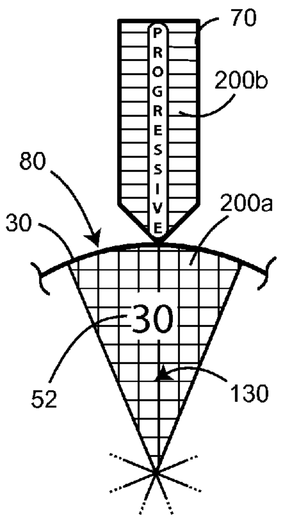
FIG. 5 is a front elevational diagram of a win designator and wheel segment.
Figure 8:
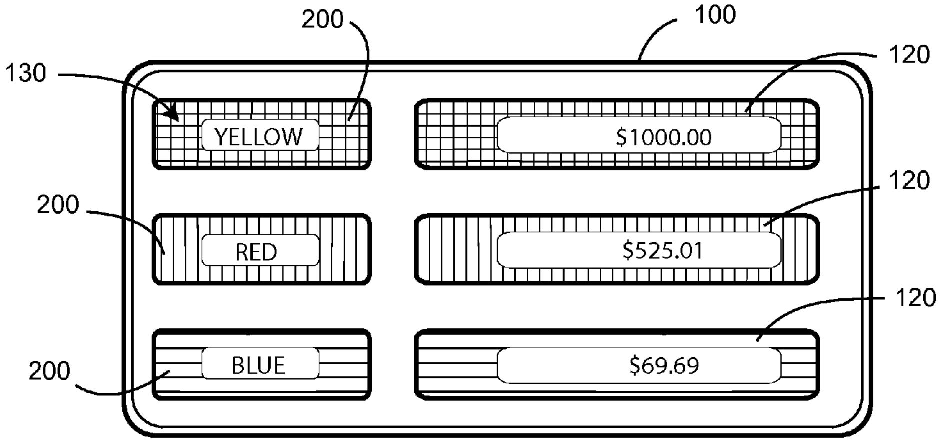
FIG. 8 is a front elevational diagram of a progressive display using colors.
Figure 10:
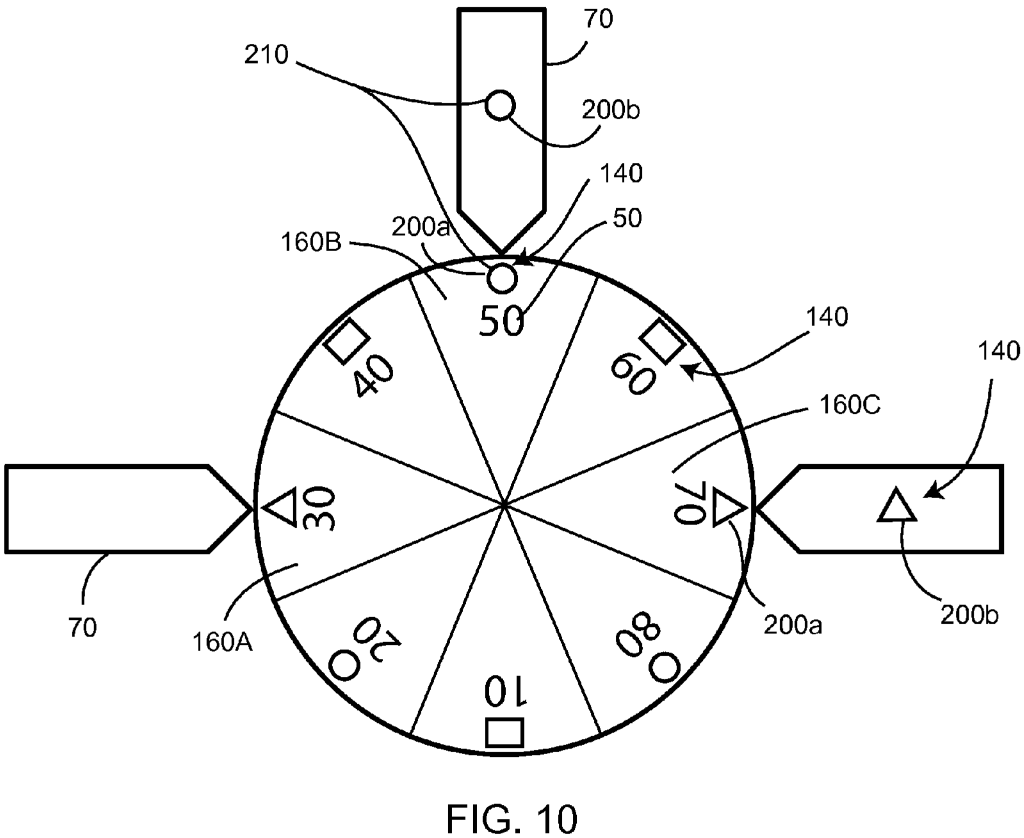
FIG. 10 is a front elevational diagram of a rotatable display wheel and multiple win designators using symbols.
Figure 11:
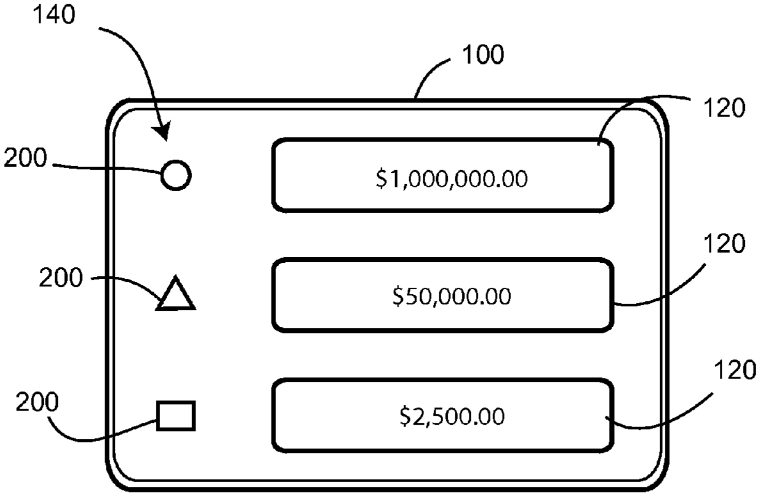
FIG. 11 is a front elevational diagram of a progressive display using symbols.

With respect to the drawings, FIG. 1 illustrates a progressive jackpot system 10 for a plurality of gaming machines 20. The progressive jackpot system 10 includes at least one progressive jackpot 120 (FIG. 8). Each progressive jackpot 120 has a different associated jackpot indicator 200, as illustrated in FIG. 8. In one embodiment, each jackpot indicator 200 is based on color 130 (FIGS. 5, 8). In another embodiment, each jackpot indicator 200 is based on symbols 140 (FIGS. 10, 11).

In FIG. 1, the progressive jackpot system 10 includes a plurality of rotatable display wheels 30 each associated with and actuated by one of the gaming machines 20 in accordance to a predetermined set of spin rules. Each display wheel 30 includes a front face 35 portioned into a plurality of segments 40 (FIG. 1). Each segment 40 is adapted to display a numeric indicator 50 and a first jackpot indicator 200*a*, illustrated in FIGS. 1 and 9.

Figure 6:
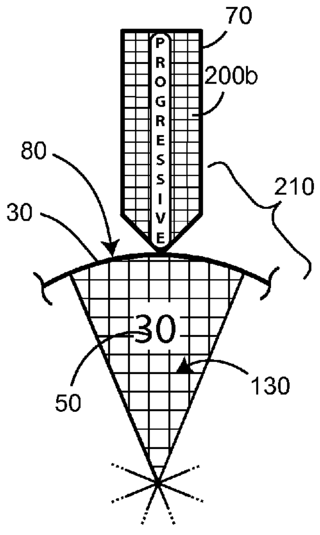
FIG. 6 is a front elevational diagram of a win designator and wheel segment.
Figure 7:
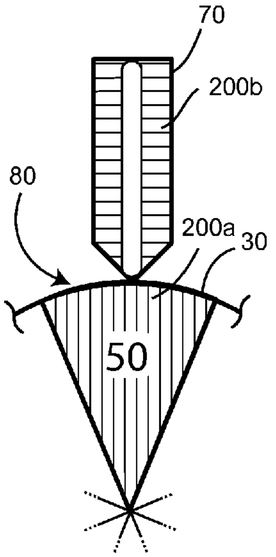
FIG. 7 is a front elevational diagram of a win designator and wheel segment.

At least one win designator 70 is positioned peripherally to each display wheel 30 and adapted to indicate one of the plurality of segments 40 as a selected segment 80 and displays a second jackpot indicator 200*b*, as illustrated in FIGS. 5-7. A progressive display 100, in FIG. 8, displays each progressive jackpot 120 and each associated jackpot indicator 200.

When each display wheel 30 is rotated and allowed to slow down and stop, the selected segment 80 as indicated by the win designator 70 indicates a selected won numerical amount 52 based on the numeric indicator 50, illustrated in FIG. 1. If the first jackpot indicator 200*a* on the selected segment 80 matches the second jackpot indicator 200*b* of the win designator 70, then the system 10 awards the progressive jackpot 120 associated with the matching jackpot indicators 200*a*, 200*b* as displayed on the progressive display 100. For example, if a wheel segment 40 has a yellow jackpot indicator 200*a* and stops on a win designator 70 also having a yellow jackpot indicator 200*b*, the player (not shown) would win the amount indicated by the numeric indicator 50 plus the value of the progressive jackpot 120 having a yellow jackpot indicator 200.

In one embodiment, each segment 40 of each display wheel 30 has color 130 applied at least partially thereto, and wherein the color 130 of the second jackpot indicator 200*b* of at least one of the at least one win designator 70 is driven by an electronic illumination means 150. In another embodiment, each segment 40 of each display wheel 30 has a symbol 140 applied thereto, and wherein the symbol 140 of the second jackpot indicator 200*b* of at least one of the at least one win designator 70 is driven by the electronic illumination means 150. In an additional embodiment, both the first jackpot indicator 200*a* and the second jackpot indicator 200*b* are indicated using the electronic illumination means 150. In another embodiment, the progressive display 100 is displayed using the electronic illumination means 150. Preferably, the electronic illumination means 150 uses LCD technology. In additional embodiments, the electronic illumination means 150 can be from other equivalents such as light bulbs, LED lights, plasma display, or suitable television type technology.

Figure 9:
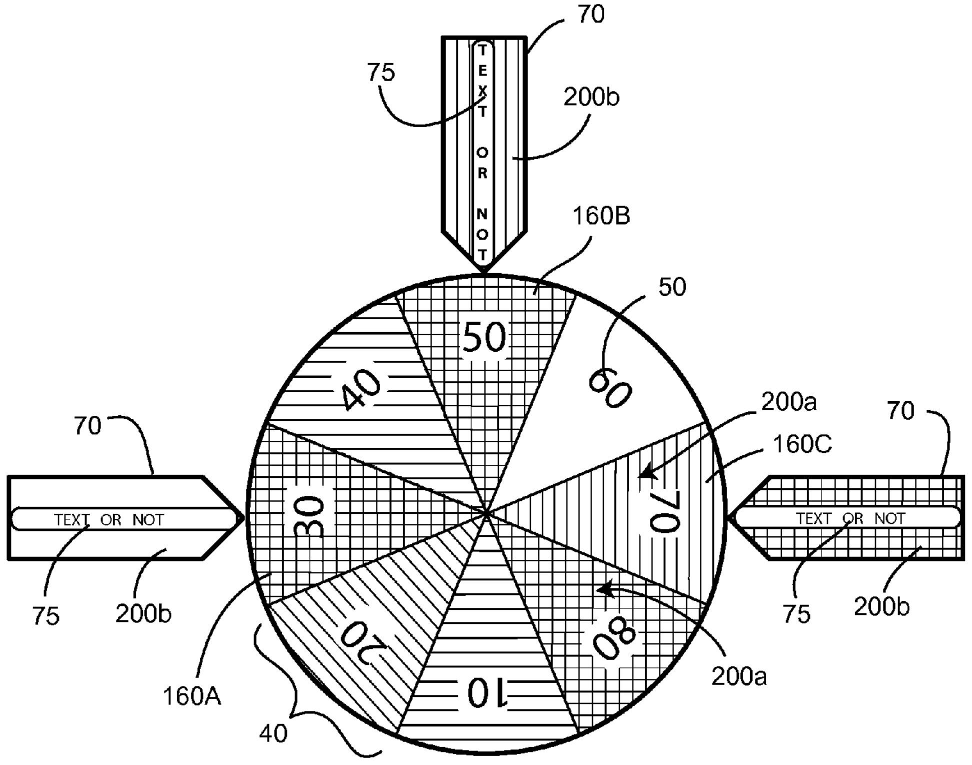
FIG. 9 is a front elevational diagram of a rotatable display wheel and multiple win designators using colors.

In another embodiment, each wheel 30 includes a plurality of the win designators 70 positioned peripherally thereto, illustrated in FIGS. 9 and 10. Each win designator 70 is adapted to indicate one of the plurality of segments 40 as a selected segment 80 and to display at least one of the second jackpot indicators 200*b*. Each win designator 70 indicates different selected segments 80. Each win designator 70 can be enabled simultaneously or one at a time to indicate the ability to win one or multiple progressive jackpots 120. Each win designator 70 can be disabled to indicate that a progressive jackpot 120 win is not available. To entice the player to bet more, more win designators 70 can be enabled when a player bets more or be enabled due to some other player selectable action such as payline played on the gaming machine 20.

In a preferred embodiment, the rotation of each display wheel 30 and the display of each first jackpot indicator 200*a* and each second jackpot indicator 200*b* are actuated by the associated gaming machine 20, in accordance with the predetermined set of rules. In on the progressive display 100 are determined at least partially by data of each gaming machine 20.

Figure 2:
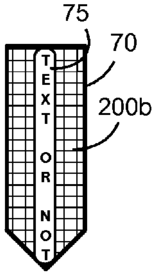
FIG. 2 is a front elevational diagram of a win designator.
Figure 3:
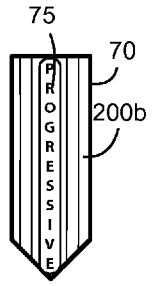
FIG. 3 is a front elevational diagram of a win designator.
Figure 4:
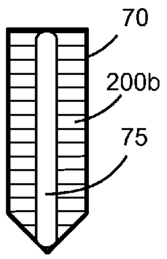
FIG. 4 is a front elevational diagram of a win designator.

In one embodiment, illustrated in FIGS. 2 and 3, each win designator 70 includes an area 75 for displaying text. In a preferred embodiment, each win designator 70 includes the text "Progressive" (FIG. 3) on it to indicate association with one of the progressive jackpots 120. Also in another embodiment, the text "Progressive" on the win designator 70 can be turned on or off to indicate when each progressive jackpot 120 is available to win or not, illustrated in FIGS. 3 and 4. Likewise, the colors 130 or symbols 140 on each win designator 70 can be turned on or off to indicate when each progressive jackpot 120 is available to win or not. In addition, the jackpot indicators 200*a*, 200*b* can change randomly or can change based on a predetermining factor such as bet level.

In another embodiment, the invention includes a method of designating a winner of a progressive jackpot 120 of a plurality of gaming machines 20. In a first embodiment of the method, the progressive jackpot system 10 is provided for the plurality of gaming machines. Each gaming machine 20 periodically rotates its associated display wheel 30 and allows the display wheel 30 to slow and stop. The selected segment 80 is indicated by any associated win designators 70 indicating a selected won numerical amount 52. If the first jackpot indicator 200*a* on any of the selected segments 80 matches the second jackpot indicator 200*b* of the associated win designator 70, then, for each matching set of jackpot indicators 210, the system 10 adds to the won numerical amount 52 each associated progressive jackpot 120 as displayed on the progressive display 100.

In one embodiment of the method, the rotation of each display wheel 30 and the display of each first jackpot indicator 200*a* and each second jackpot indicator 200*b* are actuated by the associated gaming machine 20, in accordance with the predetermined set of rules. In another embodiment of the method, each progressive jackpot 120 and associated jackpot indicator 200 on the progressive display 100 are determined at least partially by data of each gaming machine 20.

In one embodiment, each numeric indicator 50 on each wheel 30 may be intermittently changed according to a predefined set of jackpot rules that are established by the operators of the system 10. For example, periodically each numeric indicator 50 might jump by a factor of 10 for one minute, for example, lending to increased excitement of the players and an entertaining, apparent unpredictability of the system 10. Likewise, each progressive jackpot 120 on the progressive display 100 may be intermittently changed according to the predefined set of jackpot rules in a similar or alternate manner.

While a particular form of the invention has been illustrated and described, it will be apparent that various modifications can be made without departing from the spirit and scope of the invention. For example, in addition to colors 130 or symbols 140, jackpot indicators 200 can use letters or text to identify each progressive jackpot 120. Also, in another embodiment each wheel segment 40 and each win designator 70 can all display the same jackpot indicator 200 when a guaranteed win is desired. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms.

Accordingly, the inventor reserves the right to add additional claims after filing the application to pursue such additional claim forms for other aspects of the invention.

What is claimed is:

1. An award indicator for a gaming machine comprising:

a rotatable display wheel associated with a gaming machine, said display wheel including a front face portioned into a plurality of segments, each segment adapted to display a numeric amount and a segment jackpot indicator selected from a group of at least two progressive jackpot indicators, each progressive jackpot indicator designating a different progressive jackpot having a value; and at least one stationary win designator positioned peripherally to said display wheel and adapted to indicate one of the plurality of segments of said display wheel as a selected segment and to display a win designator jackpot indicator selected from said group of at least two progressive jackpot indicators;

wherein said display wheel is configured to rotate in accordance with one or more game spin rules and to slow down and stop, whereby said at least one win designator designates a selected segment of said display wheel and wherein said win indicator:

(a) awards a first award comprising said numeric amount displayed by said selected segment; and (b) if the progressive jackpot indicator displayed by said selected segment matches the progressive jackpot indicator displayed by said win designator, further award said value of said progressive jackpot associated with said matching progressive jackpot indicator.

2. The award indicator in accordance with claim 1 wherein said at least two progressive jackpot indicators comprise different colors.

3. The award indicator in accordance with claim 1 wherein said at least two progressive jackpot indicators comprise different symbols.

4. The award indicator in accordance with claim 1 wherein said display wheel is part of a system including multiple display wheels, each display wheel associated with a different gaming machine.

5. The award indicator in accordance with claim 4 further comprising at least one progressive jackpot display, said progressive jackpot display displaying each progressive jackpot in said group, the value of each jackpot and the jackpot indicator which designates each jackpot.

6. The award indicator in accordance with claim 1 wherein said segment jackpot indicators may be intermittently changed in accordance with a predefined set of jackpot rules.

7. The award indicator in accordance with claim 1 wherein said numeric amount associated with each segment may be intermittently changed in accordance with a predefined set of jackpot rules.

8. The award indicator in accordance with claim 1 further comprising at least two win indicators, each win indicator displaying a win indicator jackpot indicator and configured to indicate one of the plurality of segments of said display wheel.

9. The award indicator in accordance with claim 8 wherein said award indicator is configured to award said numeric amount associated with each selected segment and if the progressive jackpot indicator designated by a selected segment matches the progressive jackpot indicator designated by said associated win designator, further award said value of each progressive jackpot associated with each matched progressive jackpot indicator.

10. The award indicator in accordance with claim 1 wherein said value of each progressive jackpot changes over time.

11. The award indicator in accordance with claim 1 wherein said win designator jackpot indicator is randomly selected from said group of jackpot indicators by said award indicator.

12. The award indicator in accordance with claim 1 wherein at least said segment jackpot indicator or said win designator jackpot indicator is displayed by an electronic display device.

13. A method of designating one or more gaming machine awards at a gaming machine comprising the steps of:

(a) providing an award indicator for a gaming machine comprising:

rotatable display wheel associated with a gaming machine, said display wheel including a front face portioned into a plurality of segments, each segment adapted to display a numeric amount and a segment jackpot indicator selected from a group of at least two progressive jackpot indicators, each progressive jackpot indicator designating a different progressive jackpot having a value; and at least one stationary win designator positioned peripherally to said display wheel and adapted to indicate one of the plurality of segments of said display wheel as a selected segment and to display a win designator jackpot indicator selected from said group of at least two progressive jackpot indicators;

(b) rotating said display wheel in accordance with one or more game spin rules;

(c) allowing said display wheel to slow down and stop;

(d) designating a segment of said display wheel as a selected segment with said at least one win designator:

(e) awarding a first award comprising said numeric amount displayed by said selected segment; and (f) if the progressive jackpot indicator displayed by said selected segment matches the progressive jackpot indicator displayed by win designator, further awarding said value of said progressive jackpot associated with said progressive jackpot indicator.

14. The method in accordance with claim 13 wherein said at least two progressive jackpot indicators comprise different colors.

15. The method in accordance with claim 13 wherein said at least two progressive jackpot indicators comprise different symbols.

16. The method in accordance with claim 13 further comprising a system comprising award indicators associated with different gaming machines.

17. The method in accordance with claim 16 wherein said system further comprises at least one progressive display, and further comprising the step of displaying the value of each progressive jackpot in said group with its associated jackpot indicator.

18. The method in accordance with claim 13 further comprising at least two win indicators associated with said display wheel, each win indicator displaying a win designator jackpot indicator, and further comprising the steps of:

designating a selected segment using each win indicator;

awarding said numeric amount associated with each selected segment;

awarding said value of each progressive jackpot for each match of a segment jackpot indicator of a selected segment with a win designator jackpot indicator of its associated win designator.

19. The method in accordance with claim 13 further comprising intermittently changing said numeric amount associated with a segment, said win designator jackpot indicator or said segment jackpot indicator.

20. The method in accordance with claim 13 further comprising the step of utilizing an electronic display to display each segment jackpot indicator and win indicator jackpot indicator.

* * * * *